United States Patent [19]

Brown et al.

[11] Patent Number: 5,017,258

[45] Date of Patent: May 21, 1991

[54] PIPE REHABILITATION USING EPOXY RESIN COMPOSITION

[75] Inventors: Ralph E. Brown; Marlene Canahuati; Roy J. Jackson, all of Houston, Tex.

[73] Assignee: Shell Oil Company, Houston, Tex.

[21] Appl. No.: 120,190

[22] Filed: Nov. 6, 1987

Related U.S. Application Data

[63] Continuation of Ser. No. 876,555, Jun. 20, 1986, abandoned.

[51] Int. Cl.$^5$ .............................................. B29C 63/26
[52] U.S. Cl. ...................................... 156/294; 156/330
[58] Field of Search .................... 427/230, 236, 386; 264/95, 267-270, 566, 571, 250, 259, 261-263, 500, 512, 515, 523, 339, 285; 156/294, 287, 285, 156, 286, 303, 293, 330, 275.7; 138/141, 143, 97, 176, 199

[56] References Cited

U.S. PATENT DOCUMENTS

| | | | |
|---|---|---|---|
| 3,634,323 | 1/1972 | Moran | 528/44 |
| 3,677,978 | 7/1972 | Dowbenko et al. | 260/2 |
| 3,746,686 | 7/1973 | Marshall et al. | 260/47 |
| 3,945,972 | 3/1976 | Sakamoto | 525/523 |
| 4,009,063 | 2/1977 | Wood | 156/294 |
| 4,064,211 | 12/1977 | Wood | 156/294 |
| 4,066,625 | 1/1978 | Bolger | 260/37 |
| 4,069,203 | 1/1978 | Carey et al. | 528/94 |
| 4,135,958 | 1/1979 | Wood | 427/230 |
| 4,251,426 | 2/1981 | McClure et al. | 260/37 |
| 4,358,571 | 11/1982 | Kaufman et al. | 525/524 |
| 4,528,308 | 7/1985 | Waddill | 523/466 |
| 4,581,247 | 4/1986 | Wood | 427/230 |

FOREIGN PATENT DOCUMENTS

| | | |
|---|---|---|
| 0751231 | 11/1970 | Belgium . |
| 3324339 | 1/1985 | Denmark . |
| 0573325 | 8/1982 | European Pat. Off. . |
| 0145654 | 6/1985 | European Pat. Off. . |
| 1951600 | 4/1970 | Fed. Rep. of Germany . |
| 2164302 | 8/1972 | Fed. Rep. of Germany . |
| 2810428 | 9/1978 | Fed. Rep. of Germany . |
| 9053698 | 9/1972 | Japan . |
| 4725300 | 10/1972 | Japan . |
| 48-03238 | 1/1973 | Japan . |
| 1041100 | 10/1974 | Japan . |
| 9115083 | 11/1974 | Japan . |
| 0031000 | 3/1975 | Japan . |
| 0059499 | 5/1975 | Japan . |
| 1012900 | 1/1976 | Japan . |
| 6045640 | 12/1976 | Japan . |
| 7003828 | 1/1977 | Japan . |
| 2087167 | 7/1977 | Japan . |
| 2090560 | 7/1977 | Japan . |
| 4054199 | 4/1979 | Japan . |
| 4154499 | 12/1979 | Japan . |
| 5071749 | 5/1980 | Japan . |
| 5075421 | 6/1980 | Japan . |
| 5165916 | 12/1980 | Japan . |
| 7092019 | 6/1982 | Japan . |
| 7092020 | 6/1982 | Japan . |
| 8166902 | 10/1983 | Japan . |
| 3123500 | 6/1984 | Japan . |
| 9108070 | 6/1984 | Japan . |
| 0053525 | 3/1985 | Japan . |
| 0053526 | 3/1985 | Japan . |
| 0079029 | 5/1985 | Japan . |
| 2023611 | 1/1980 | United Kingdom . |

*Primary Examiner*—John J. Gallagher
*Assistant Examiner*—Steven D. Maki

[57] ABSTRACT

An epoxy resin composition containing an imidazole curing agent is useful in processes for lining the interior surfaces of buried pipes. The imidazole is non-substituted at the 1 position and is preferably alkyl-substituted at the 2 position, such as 2-propyl imidazole. Pipe-lining compositions using such imidazole-cured systems have long working lives, short cure times at moderate temperatures, low tendency to exotherm, insensitivity to moisture, and low creep and shrinkage, resulting in a pipe-lining system which can be used in a wide range of field conditions and produces a superior pipe liner.

13 Claims, No Drawings

PIPE REHABILITATION USING EPOXY RESIN COMPOSITION

This is a continuation of application Ser. No. 876,555, filed June 20, 1986, now abandoned.

BACKGROUND OF THE INVENTION

The invention relates to methods and compositions useful for rehabilitating underground pipe in place. In a further aspect, the invention relates to epoxy resin pipe liners containing curing agents which impart controlled, hard cure in moist environments and have long working lives.

Repairing underground pipelines, such as water, chemical and sewer pipes, can be an expensive and difficult task. Such underground pipelines are subject to fracture and corrosion, resulting in uneven flow within the pipe, leakage of fluid and, eventually, complete rupture of the pipe. Repair of the ruptured or leaking pipe can involve time-consuming and expensive excavation and replacement of the damaged pipe and, in the case of pipelines extending under roads and buildings, for example, can be extremely costly or impractical.

Various means have been devised to repair lengths of underground pipe in place, without excavation and removal of the pipe. One such method involves lining the interior of a pipe with a nonwoven felt impregnated with a catalyzed liquid thermosetting resin. The felt is inverted into one end of the pipe to be repaired in such a way that the resin-impregnated felt is positioned against the interior walls of the pipe, and the thermosetting resin is then cured, in situ, to form a cured functional resinous pipe within and adhering to the treated pipe. Such a method repairs defects in the pipe and protects the pipe from further deterioration. There are numerous difficulties in carrying out such a process, which makes stringent demands on the resin/curing agent system used. The system must have low shrinkage of the thermosettable material during and after cure, which could result in cracking of the cured material. Moisture is almost invariably present during the cure, and slow or incomplete cure results from attempting in situ cure of a moisture-sensitive system. If the thermosettable system is subject to rapid, uncontrollable exotherm during cure, excessive heat can be generated and degradation of the lining material can result. If the pipe lining job involves the repair of pipe corroded completely through, it is necessary to use a resin system which exhibits good creep resistance, or the liner will fail. The working life of the resin/curing agent system, by which is meant the time after mixing the curing agent with the resin during which the system is sufficiently flexible to permit application to the felt and insertion of the felt into the pipe, must be long enough to permit convenient application in the field at ambient temperatures, which can vary widely with location, and yet be sufficiently reactive to harden in a reasonable time at temperatures obtainable from a boiler truck in a field operation.

Polyester is used as a pipe-liner resinous material, but because of its high shrinkage and styrene boil, it is used only for ambient temperature and pressure applications. "Styrene boil" is the generation of styrene vapor in the polyester matrix from excessive heat build-up during cure. Styrene boil results in a porous pipe lining, which is unsuitable for high-pressure pipelines. Because of the need for relatively rapid cure of pipe-lining systems and the difficult conditions under which cure of in situ pipe liners is carried out, resistance to uncontrollable exotherming and the evolution of vapors is an important property of pipe-lining system. Polyester liners are also very susceptible to shrinkage, commonly exhibiting a volume shrinkage of 6–10%. Epoxy resins cured with 1-substituted imidazoles, such as the reaction product of imidazole and propylene oxide, have also been used. Such systems have been found to be sensitive to moisture and exotherm in the curing environment. Because the environment of in situ pipe-lining invariably includes water and heat, moisture and exotherm insensitivity are very important properties of pipe-lining systems. Such systems are somewhat susceptible to shrinkage, exhibiting a volume shrinkage of 2–3%.

For in situ pipe repair, it is therefore necessary to design thermosetting resin systems which have a combination of properties including moisture and shrink resistance, creep resistance, controllable exotherm, good cured flexibility and strength, short cure time at moderate temperatures, and long system working life.

It is therefore an object of the present invention to provide an improved process for in situ formation using a thermosettable epoxy resin system.

BRIEF DESCRIPTION OF THE INVENTION

According to the invention, a method is provided for lining the interior of a pipe, the method comprising applying to the interior of the pipe to be lined a felt or other adsorbent substrate impregnated with an epoxy resin composition containing a curing amount of an imidazole, preferably a 2-alkyl-substituted imidazole in liquid form at ambient temperature. The epoxy resin-impregnated carrier is then inserted into the pipeline and positioned in contact with the pipeline wall to be lined. The epoxy resin is then cured in place so as to cause the substrate to adhere to the pipeline wall and thereby form an interior essentially cylindrical "pipe within a pipe" which acts as a barrier against leakage of fluids from the pipe.

DETAILED DESCRIPTION OF THE INVENTION

The imidazole curing agent useful in the invention process is an imidazole which is unsubstituted at the "1" nitrogen position. The preferred imidazoles are those which are hydrocarbyl-substituted at the "2" position; that is, those in which R in the formula below is hydrogen or a $C_1$–$C_{10}$

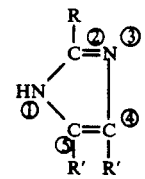

hydrocarbyl alkyl or aryl substituent, and each R′ is selected independently from hydrogen and $C_1$–$C_{10}$ substituted or unsubstituted hydrocarbyl. Included in the imidazoles useful in the invention pipe-lining process are imidazole, 2-methyl imidazole, 2-ethyl imidazole, 2-propyl imidazole, 2-ethyl-4-methyl imidazole, 2-phenyl imidazole, and the like. The currently preferred 2-alkyl substituted imidazoles is 2-n-propylimidazole because of the superior creep resistance, moisture insensitivity and exotherm control of the pipe-lining system.

The preferred imidazoles for use in pipe-lining applications are in liquid form, for greater ease of mixing with the resin and application to the liner web. Normally-solid imidazoles can be adapted to the process by, for example, solubilizing in an inert solvent or forming a eutectic mixture with one or more suitable materials. It has been found particularly suitable to use a liquid mixture comprising a major portion of 2-n-propylimidazole and a minor portion of imidazole and at least about 5 percent other by-products of the preparation of 2-n-propyl imidazole via the condensation reaction of glyoxal with ammonia and formaldehyde.

The imidazole-cured resin system used in the invention pipe lining process includes a thermosettable resin having an average of more than one vicinal epoxide group per molecule. The thermosettable resin component used with the curing system can be any curable epoxy resin having an average of at more than one vicinal epoxide group are molecule. The epoxy resin can be saturated or unsaturated, aliphatic, cycloaliphatic, aromatic or heterocyclic, and may bear substituents which do not materially interfere with the curing reaction. They may be monomeric or polymeric. The thermosettable resin components may be within the classes of epoxy novolac resins are glycidated maines.

Suitable epoxy resins include glycidyl ethers prepared by the reaction of eipchlorohydrin with a compound containing at least one hydroxyl group carried out under alkaline reaction conditions. The epoxy resin products obtained when the hydroxyl group containing compound is bisphenol-A are represented below by structure I wherein n is zero or a number greater than 0, commonly in the range of 0 to 10, preferably in the range of 0 to 2.

of a detergent alcohol, generally present in an amount of up to about 20 weight percent, based on the weight of the epoxy resin. Up to about 2 weight percent of a thixotropic agent such as Cabosil can be included in the composition.

The imidazole is added to the epoxy resin, with mixing, prior to application to the pipe-liner substrate. In bulk, the epoxy resin/curing agent composition will have a working time of from about 10 to about 50 hours at ambient conditions, depending upon a variety of factors including the amount of curing agent in the composition and the temperature. By "working time" is meant the time after one gallon of the epoxy resin and the imidazole curing agent are mixed and before the mixture becomes too viscious, generally greater than about 25,000 centipoise, for application to the substrate felt and insertion into the pipe to be lined.

The curing agent is added to the epoxy resin an an amount effective to cure the epoxy resin and to form a pipe liner having the desired properties. The amount of curing agent used will vary depending upon the thickness of the lining to be applied. The imidazole curing agent will generally be added in an amount of from about 0.5 to about 15 weight percent, based on the weight of the epoxy resin, preferably about 1 to about 8 weight percent. For pipe-lining applications involving pipe liners which are smaller than about 15 mm in thickness, the amount of curing agent will be in the lower end of the range, generally about 1 to about 4, preferably about 2 to about 3 weight percent, based on the weight of the epoxy resin. Such systems would be expected to have a working life of up to about 40 hours. For pipe-lining applications involving pipe liners which are greater than about 15 mm in thickness, the amount

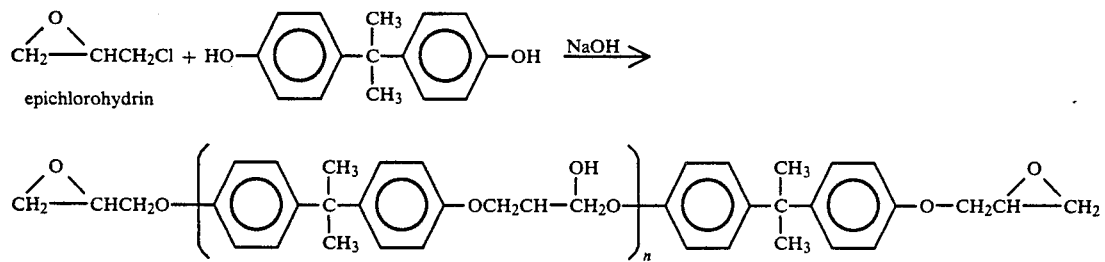

I

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially available epoxy resins EPON ® Resin 828, a reaction product of epichlorohydrin and bisphenol-A having a molecular weight of about 400, an epoxide equivalent (ASTM D-1652) of about 185-192, and an a value in formula I above of about 0.2, and EPON ® 9215, which is EPON ® 828 and 8 weight % glycidated detergent alcohol and 1.5 weight percent thixotropic agent, are presently the preferred epoxy resins because of the their commercial availability, low viscosity and the properties of the cured systems. For pipe-lining applications, it is preferable to combine the epoxy resin with a diluent such as a monoglycidyl ether of curing agent in the pipe-liner system will be in the upper end of the range, generally about 3 to about 8, preferably about 4 to about 6, weight percent. Such systems would be expected to have a working life of up to about 17 hours. The amount of curing agent used must be sufficiently high to cure readily at temperatures in the range of about 40° to 100° C. but sufficiently low to resist rapid exotherming of the epoxy resin, which can result in an unacceptably brittle or cracked pipe lining.

The epoxy/curing agent system is then applied to adsorbent substrate or "sleeve" having an adsorbent felt of polyester or similar material on one side (the side to be positioned against the pipe) and, preferably, a water-resistant film of polyurethane, polyvinyl chloride or the like on the opposing surface. The sleeve is tailored to fit within the pipe being lined. The felt is saturated with the resin system, and the saturated sleeve is packed in ice if necessary under the surrounding conditions to prevent cure prior to application in the pipe, and the saturated sleeve is then transported to the site of the pipe repair. At the jobsite, an inversion tube is suspended from a scaffold constructed above the access to the buried pipe to be lined. The epoxy-treated sleeve is passed from the top of the scaffold through the inversion tube, and is cuffed and attached to the end of the tube. A fluid such as water or air is introduced into the annular space between the inversion tube and the sleeve, which creates pressure on the cuff and causes the tube to unfold and "walk" into and through the pipe. This positions the resinimpregnated sleeve within the pipe with the resin-saturated felt in firm contact with the interior wall of the pipe to be lined. When the tube is in place, a hot fluid such as hot water or steam is circulated into the tube so as to heat the epoxy resin system to its cure temperature and initiate cure of the resin.

The optimum water temperature and cure time will depend upon the specific epoxy resin system used and the conditions of application, but the water temperature will generally be within the range of about 50° to about 100° C., preferably about 65° to about 85° C. Cure at these temperatures will generally occur within about 3 to about 20 hours, but the cure time will also depend upon the thickness of the liner to be applied to the material of the repaired pipe, and the temperature and thermal conductivity of the soil. Exotherming of epoxy pipe-lining systems can often be controlled by staging the cure at progressively increasing temperatures between about 40° and 85° C.; however, the 2-substituted imidazole system is particularly resistant to rapid exotherm and does not generally require staged cure. After cure, both ends of the hardened epoxy-impregnated sleeve are cut, and the lined pipe is ready for service. The cured resin-felt composite provides an impervious liner which adheres to the pipe and prevents leakage of fluids and slows further internal deterioration of the pipe. Cure can take place in low- or high-temperature environments, as the system has a volume shrinkage of as low as 1-2 percent and maintains good adhesion even in cold-weather environments.

The process can be used with any pipeline material, including concrete, metallic, PVC and clay. The size of the treated pipe can range from about 4 to about 90 inches in diameter and up to 50 mm thick.

EXAMPLE 1

The following is a description of the procedure used to test a pipe-lining method and illustrating the superior moisture insensitivity and shrink resistance of the system used. The test was a small-scale field test done under cold-weather conditions employing a 2-substituted imidazole cured epoxy pipe liner. 225 pounds of EPON® Resin 9215 (a liquid polyglycidyl ether of bisphenol-A having a WPE of about 185-192, about 4 to 10 weight percent of a reactive monomeric diluent, and about 1.5 weight percent of a thixotropic agent) were blended for 15 minutes with 9 pounds EPON® Curing Agent 9264 (4 parts by weight, based on epoxy resin, of 2-propylimidazole) using a hydraulic mixer. The air temperature during the outdoor mixing was 46° F. The resin temperature at the time of mixing was 83° F. but had dropped to 77° F. by the time mixing was completed. An additional 25 pounds of resin and 1 pound of curing agent were added and mixed for another 10 minutes to compensate for high clingage anticipated from the low air temperature.

An 18' long, 18" diameter, 15 mm thick polyester felt tube having a PVC outer film was wetted on the inside with the above 260 pounds of resin/curing agent under vacuum. To accommodate inversion of the resin-impregnated tube and more closely simulate actual field conditions, a 25' trench 5' deep was dug. The soil temperature at the bottom of the trench was 40° F. The air temperature was 45° F. In order to test the cure performance of this system under conditions of both high and low thermal conductivity, the resin-impregnated tube was inverted into 7 feet of highly conductive steel pipe immediately followed by 7 feet of insulating Sonotube cardboard pipe. After the inversion, the pipes in the trench were covered with soil, leaving an access at each end of the pipe.

Water heated to a temperature of about 180° F. was circulated through a boiler truck into the lined felt tube so as to raise the temperature of the resin to the curing point. A 6" tear inadvertently made in the tube during inversion permitted water to flow through the tube and into the interface between the steel and the PVC liner during the curing operation, resulting in less than ideal conditions for cure. In addition, heavy rain fell during the cure, filling the access at either end of the trench and requiring the system to cure in the presence of water. Hot water flow was continued for about 3 hours.

The resin-impregnated tube cured well except for the area immediately surrounding the tear, where the resin was soft. The following day, the temperature dropped and snow fell, but the cured resin tube continued to adhere to the pipe and did not shrink away from the pipe walls.

The test run illustrates the problems of filed applications of pipe liners, the extreme environmental conditions which may be encountered and make necessary a moisture-resistant, low shrinkage curing agent, and the cure conditions which demand an exotherm-controllable resin system. Because of the long working life of the system used, it was not necessary to ice the epoxy/felt composite during 7-8 hours after wetout and before inversion.

EXAMPLE 2

The following table comprising physical properties of a 2-propyl imidazole-cured epoxy resin system (System A) with a 1-substituted imidazole-cured system (System B) illustrates the superior pipe-lining related properties of the 2-substituted imidazole system. System B was prepared by mixing EPON Resin 9215 and 4 weight percent N-isopropanol imidazole. System A was prepared by mixing EPON Resin 9215 and 4 weight percent 2-propyl imidazole curing agent. Both systems have a viscosity of about 5000 cps at A77° F. System B was stage-cured for two hours at 120° F. and 2 hours at 150° F. System A was cured for 3 hours at 160° F.

TABLE 1

| Property | System A | System B |
| --- | --- | --- |
| Working life,[a] hrs | 17 | 10-12 |
| Cure time, hrs | 3-4 | 4-14 |
| Sensitivity to exotherm | low | high |
| Sensitivity to water | low | high |
| Tensile strength, psi[b] | 9,000 | 9,200 |
| Tensile modulus, psi × $10^{-3}$[b] | 435 | 480 |
| Tensile elongation, %[b] | 3.0 | 2.0 |
| Flexural strength, psi[b] | 18,000 | 18,000 |
| Flexural modulus, psi × $10^{-3}$[b] | 480 | 500 |
| HDT, °F.[b] | 192 | 194 |
| Tensile strength, psi[c] | 5,000 | 5,000 |
| Tensile modulus, psi × $10^{-3}$[c] | 550 | 430 |

TABLE 1-continued

| Property | System A | System B |
|---|---|---|
| Tensile elongation, %[c] | 1.6 | 1.2 |
| Flexural strength, psi[c] | 9,000 | 9,500 |
| Flexural modulus, psi × 10$^{-3}$[c] | 490 | 460 |

[a] 1 gallon at 77° F.
[b] Cured castings
[c] Epoxy/felt composite

EXAMPLE 3

Tensile creep tests were carried out on a series of tensile bars to predict the resistance to creep of cured pipe liners, an important property for pipe-liner materials, particularly where the pipe to be repaired is severely deteriorated. The results of creep tests on three specimens are shown below. All samples were prepared using EPON® Resin 9215. Sample A contained 4 percent by weight 1-isopropanol imidazole stage-cured for 2 hours at 120° F., 2 hours at 140° F. and 2 hours at 160° F. Sample B contained 4 percent by weight 1-isopropanol imidazole cured on a 2 hr/120° F., 2 hr/150° F., 3 hr/300° F. cycle. Sample C contained 4 percent by weight 2-n-propyl imidazole cured for 3 hours at 160° F. Tensile tests were conducted on a 4-station lever arm creep machine and a dead-load creep frame. The initial stress was 3 ksi for all samples. Testing temperature was maintained at 73° F. Sample elongation was measured by a linear variable differential transformer. All strains were reported as true strain. The results of the creep tests are reported in Table 1. Sample C, cured with 2-n-propyl imidazole under relatively mild cure conditions, showed significantly greater resistance to creep, compared with test specimens cured (Sample A) and postcured (Sample B) with 1-isopropanol imidazole.

TABLE 2

| Time, hrs | Creep Strain, % | | |
|---|---|---|---|
| | A | B | C |
| 0 | 0.73 | 0.65 | 0.53 |
| 100 | 0.98 | 1.05 | 0.75 |
| 200 | 1.08 | 1.15 | 0.83 |
| 300 | 1.14 | 1.19 | 0.89 |
| 400 | 1.18 | 1.23 | 0.92 |
| 500 | 1.22 | 1.26 | 0.95 |
| 600 | 1.25 | 1.28 | 0.97 |

We claim:

1. A method for lining the interior of a pipe comprising impregnating an adsorbent substrate with a composition comprising an epoxy resin having an average of more than one vicinal epoxide group per molecule and from about 0.5 to about 15 weight percent, based on the weight of the epoxy resin, of a non-1-substituted imidazole, placing the thus-impregnated substrate within the pipe to be lined and in contact with an interior surface thereof, and curing the epoxy resin, thereby causing the impregnated substrate to harden and form an essentially cylindrical interior liner for the pipe.

2. The method of claim 1 in which the thermosettable resin is cured by heating to a temperature of at least about 70° C. for a time of at least one hour.

3. The method of claim 2 in which one surface of the substrate comprises a plastic liner, the impregnated web is placed within the pipe so as to position the opposing non-lined surface in contact with the interior surface of the pipe, and the thermosettable resin is cured by contacting the lined surface of the web with water at a temperature of at least about 70° C.

4. The method of claim 3 in which the thermosettable resin is a liquid polyglycidyl ether of bisphenol-A.

5. The method of claim 1 in which the imidazole is a 2-alkyl substituted imidazole.

6. The method of claim 1 in which the imidazole is selected from the group consisting of imidazole, 2-methyl imidazole, 2ethyl imidazole, 2-propyl imidazole, 2-ethyl-4-methyl imidazole and 2-phenyl imidazole.

7. The method of claim 1 in which the imidazole comprises 2-propyl imidazole.

8. The method of claim 1 in which the imidazole is in the form of a liquid.

9. The method of claim 8 in which the imidazole is a product of the condensation reaction of glyoxal, a $C_4$ aldehyde and ammonia containing at least about 5 weight percent by-products of the reaction.

10. The method of claim 1 in which the epoxy resin and imidazole are mixed and applied to the substrate at least 3 hours prior to placement of the substrate into the pipe to be lined.

11. The method of claim 1 in which the imidazole is present in the composition in an amount of from about 1 to about 8 weight percent, based on the weight of the epoxy resin.

12. The method of claim 11 in which the composition further comprises from about 1 to about 20 weight percent of a diluent for the epoxy resin.

13. The method of claim 12 in which the diluent is a monoglycidyl ether of a detergent alcohol.

* * * * *